United States Patent [19]

Moyer et al.

[11] Patent Number: 5,375,216
[45] Date of Patent: Dec. 20, 1994

[54] APPARATUS AND METHOD FOR OPTIMIZING PERFORMANCE OF A CACHE MEMORY IN A DATA PROCESSING SYSTEM

[75] Inventors: William C. Moyer, Dripping Springs; John H. Arends, Austin; Christopher E. White, Austin; Keith E. Diefendorff, Austin, all of Tex.

[73] Assignee: Motorola, Inc., Schaumburg, Ill.

[21] Appl. No.: 844,011

[22] Filed: Feb. 28, 1992

[51] Int. Cl.$^5$ .............................................. G06F 12/02
[52] U.S. Cl. .............................. 395/421; 364/DIG. 1; 364/259.9; 364/262.5
[58] Field of Search ........................................................
364/200 MS File:900 MS File; 395/400, 425

[56] References Cited

U.S. PATENT DOCUMENTS

| | | | |
|---|---|---|---|
| 3,858,182 | 12/1974 | Delagi et al. | 340/172.5 |
| 4,719,568 | 1/1988 | Carrubba et al. | 395/425 |
| 5,148,528 | 9/1992 | Fite et al. | 395/375 |
| 5,255,378 | 10/1993 | Crawford et al. | 395/425 |

OTHER PUBLICATIONS

George Radin, "The 801 Minicomputer", paper published in the ACM SIGARCH Computer Architecture News, vol. 10, No. 2, Mar. 1982, pp. 212–221.
IBM RT PC Hardware Technical Reference, vol. 1, Third Edition, technical manual for a version of the 801 Minicomputer, published Jun. 1988 pp. 11-12,-14,-16-,-24, and -25.
Keith Diefendorff, "The 88110: A Superscalar Microprocessor with Graphics Support", (slides and transcript of speech presented at Microprocessor Forum on Nov. 6, 1991).
Keith Diefendorff, "The 88110: A Superscalar Microprocessor with Graphics Support", (preliminary sides provided Sep. 1991 for presentation of Microprocessor Forum on Nov. 6, 1991).
Keith Diefendorff and Michael Allen, "Organization of the Motorola 88110: A Superscalar RISC Microprocessor", Proceedings of Intl. Processing Society of Japan, Nov. 1991, pp. 77–87.
Keith Diefendroff and Michael Allen, "Organization of the Motorola 88110: A Superscalar RISC Microprocessor", sent to publisher for publication in 192 COMPCON Proceedings, to be published Feb. 24, 1992.
Keith Diefendorff and Michael Allen, "The Motorola 88110 Superscalar RISC Microprocessor", preliminary slides for presentation at COMPCON to be held on Feb. 24, 1992.
Keith Diefendorff and Michael Allen, "Organization of the Motorola 88110 Superscalar RISC Microprocessor", IEEE Micro, submitted to IEEE on Dec. 13, 1991 (not published yet).
Keith Diefendorff and Michael Allen, "Organization of the Motorola 88110 Superscalar RISC Microprocessor", IEEE Micro, submitted to IEEE on Jan. 21, 1992 in revised form (not published yet).
MC88100 RISC Microprocessor User's Manual, Second Edition, published by Motorola, Inc. in 1990, pp. 1-, 2-1, 2-2, 3-85, 3-86, and 3-87.
MC88200 Cache/Memory Management Unit User's Manual, Second Edition, published by Motorola, Inc, in 1990, pp. 2–4, 2-5, and 2-8.

Primary Examiner—Joseph L. Dixon
Assistant Examiner—Hiep T. Nguyen
Attorney, Agent, or Firm—Elizabeth A. Apperley

[57] ABSTRACT

A circuit for allowing greater user control over a cache memory is implemented in a data processor (20). Cache control instructions have been implemented to perform touch load, flush, and allocate operations in data cache (54) of data cache unit (24). The control instructions are decoded by both instruction cache unit (26) and sequencer (34) to provide necessary control and address information to load/store unit (28). Load/store unit (28) sequences execution of each of the instructions, and provides necessary control and address information to data cache unit (24) at an appropriate point in time. Cache control logic (60) subsequently processes both the address and control information to provide external signals which are necessary to execute each of the cache control instructions. Additionally, cache control logic (60) provides an external transfer code signal which allows a user to know when a cache transaction is performed.

21 Claims, 7 Drawing Sheets

APPARATUS AND METHOD FOR OPTIMIZING PERFORMANCE OF A CACHE MEMORY IN A DATA PROCESSING SYSTEM

FIELD OF THE INVENTION

This invention relates generally to a data processing system, and more particularly to a cache memory in a data processing system.

BACKGROUND OF THE INVENTION

Cache memory systems have been developed to enable a data processing system to access information more quickly and more efficiently. However, with the increased efficiency, flexibility and user control of the cache memory system have been limited. Such limitations are generally considered to be necessary to prevent a user from inadvertently causing an error during operation and are well known in the engineering community.

In most data processors, two levels of privilege are provided to control access to memory, cache or otherwise, during external bus transactions and to control operation of the data processor. A supervisor mode provides the highest level of privilege. When in supervisor mode, the data processor may access memory designated for both the supervisor mode and a user mode of operation. Additionally, the supervisor mode allows execution of all instructions and access to all register locations in the data processor. Typically, operating system software is executed when the data processor is in supervisor mode. Among the operating system services provided are resource allocation of both memory and peripherals, exception handling, and software execution control. Software execution control usually includes control of a user program and protecting the system from accidental or malicious corruption by a user program.

A user mode provides a second level of privilege. When in the user mode of operation, only the memory and registers designated for use in the user mode may be accessed. Additionally, only instructions stored in a user instruction memory may be referenced. For example, in the MC88100 RISC processor available from Motorola, Inc. of Austin, Tex., four instructions are accessible only in the supervisor mode of operation. Three of these instructions execute read/write accesses to a register which may only be accessed when the data processor is in a supervisor mode of operation. A fourth instruction executes an orderly termination of an exception processing routine.

If a memory, register, or instruction specified for use only in supervisor mode, is accessed when the data processor is in user mode, an exception may occur. The exception results in an interruption of operation of the data processor. A exception handler routine is then executed to process the exception and restore the data processor to a normal mode of operation.

Additionally, the data processor may only operate in supervisor mode in certain conditions. For example, the data processor operates in supervisor mode when an exception occurs. The data processor must be in supervisor mode to execute an appropriate exception processing routine. Similarly, when a reset of the data processor occurs, the data processor operates in supervisor mode. The privilege level of the data processor may also be modified by a "trap" instruction executed in user mode. For more information about exceptions and the user and supervisor modes of operation, refer to the second edition of the MC88100 RISC Microprocessor User's Manual published by Motorola, Inc. in 1990.

Limited control of a cache memory in a data processing system is typically only allowed in the supervisor mode of operation which is not readily accessible to a user of the system. For example, in the MC88200 cache/memory management unit developed by Motorola, Inc. of Austin, Tex., a single cache control operation is executed only in the supervisor mode of operation All other cache control operations are controlled internally and are not accessible to the user even in the supervisor mode of operation. For more information regarding the MC88200 cache/memory management unit, refer to the second edition of the MC88200 Cache/Memory Management Unit User's Manual published by Motorola, Inc. in 1990.

The cache control operation which is executable in supervisor mode is a "flush" operation. In a flush operation, a modified, or "dirty," storage location in the cache memory is cleared by moving, or flushing, the dirty storage location out of the cache memory. Typically, the dirty storage location is cleared when the storage location must be allocated for a new data value.

Other cache control operations which are typically executed during cache operation, but are not accessible to the user in any mode of operation, include a "cache load" operation. During the cache load operation, data is stored in the cache memory only when a "miss" occurs because the requested data value is not stored in the cache memory. When the miss occurs, a line in the cache memory must first be allocated to receive a data value. The data is subsequently read and stored at that line. Because the data must be retrieved from an external memory source, delays occur and the efficiency of the data processing system is decreased. Additionally, unnecessary bus cycles are often executed during the allocation and filling of the line in the cache memory. As was previously stated, the user is not allowed to initiate a cache load operation in any mode of operation. The cache load operation is simply a by-product of normal cache operation which may not be affected by the user.

In each of the cache control operations listed above, the user of the data processor does not have control over cache operation except for a flush instruction operation which may be executed when the data processor is in supervisor mode. Even then, supervisor mode is not easy to access, and if accessed, may result in catastrophic errors if not correctly used. Additionally, the processing time associated with modifying the privilege level of the data processor is often prohibitively long. Each of the cache control operations described above is executed in accordance with a predetermined algorithm which is designed to maximize efficiency of the data processing system. However, exceptions do occur in which the algorithm does not provide the most efficient operation of the cache memory system. In the case of an exception, the user is not able to maintain the most efficient operation of the cache memory because the data processing system is not directly controllable Therefore, a need exists for a data processing system which allows more flexibility in executing cache control operations. Additionally, a user of the data processing system should have more insight into and an ability to maximize the efficient operation of the cache memory.

SUMMARY OF THE INVENTION

The previously mentioned needs are fulfilled with the present invention. Accordingly, there is provided, in one form, a data processing system having a cache memory. The data processing system includes an interface for receiving an external operating instruction having a predetermined format. The external operating instruction is provided to control operation of the cache memory. A sequencer is coupled to the interface for receiving the operating instruction. The sequencer decodes the operating instruction to determine a cache operation to be executed in response to the operating instruction. A logic circuit is also coupled to the sequencer for receiving a first portion of the external operating instruction. The logic circuit evaluates the portion to determine a storage location in the cache memory of an information value to be manipulated during execution of the operating instruction. A cache access circuit is also coupled to the sequencer for receiving a plurality of control values corresponding to the operating instruction. The cache access circuit is also coupled to the logic circuit for receiving the storage location in the cache memory of the information value to be manipulated. The cache access circuit accesses the storage location in the cache memory to execute the operating instruction in response to the plurality of control values.

These and other features, and advantages, will be more clearly understood from the following detailed description taken in conjunction with the accompanying drawing. It is important to note the drawings are not intended to represent the only form of the invention.

DETAILED DESCRIPTION OF A PREFERRED EMBODIMENT

In this description of the preferred embodiment of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

The present invention provides an apparatus and a method for providing greater user control over a cache memory in a data processing system. In particular, three user-mode cache control instructions have been implemented to allow a user of the data processing system to have more control over the operations executed by the cache memory. The instructions are: cache preload, flush load, and allocate load.

A cache pre-load, or "touch load," instruction allows a user to store data in the cache memory system before the data is actually used by the data processing system. In prior art systems, the data is stored in the cache memory only when the data is required by the data processing system. Consequently, the cache memory may be forced to wait while the data is accessed from a source external to the data processing system. The touch load instruction allows the user to anticipate the request for a data value and store the data value in the cache memory such that delays introduced during a load operation may be minimized. Additionally, while the data value is retrieved from the source external to the data processing system, the data processing system may concurrently execute other functions. Again, the efficiency of the data processing system is increased.

In prior art systems, a dirty line of a cache memory is copied to an external memory as a side effect of allocating a line in the cache memory for a new data value. The external memory must generally be modified to reflect the data stored at the flushed line of the cache memory. Such a mode of operation is referred to as a "write-through" mode. In the write-through mode, store operations which store a data value at an address which is already in the cache memory update external memory as well as the cache memory. The store operations do not change the status of the data value at the address in the cache memory.

In the embodiment of the invention described herein, the second cache control instruction implemented forces a dirty line of a cache memory to an memory external to the data processing system without the overhead generally required to perform a store operation. In some instances, however, the external memory should be more quickly modified to reflect the data stored in the cache memory. Applications of the flush load instruction will be subsequently discussed in more detail.

The third cache control instruction implemented in one embodiment of the present invention executes a line allocation, or "allocate load" operation. An allocate instruction allows the user to allocate a line in the cache memory for a subsequent store operation while avoiding memory access times corresponding to a normal line fill transaction.

In each of the cache control instructions described above, the user is able to control operation of the cache memory and avoid delays normally required to execute each of these operations. Additionally, although the flush load operation has previously been executed in Supervisor mode in prior art systems, the Supervisor mode of operation generally requires more time to fully execute and does not allow the same flexibility as the cache control instructions which are accessible to the user.

Each of the cache control instructions described above is encoded as a load operation having a predetermined size access to a predetermined register. Before implementation of the invention described herein, any load to the predetermined register would have resulted in no operation (NOP) being executed. By encoding the cache control operations as a load operation to a predetermined register, very little added circuitry was required and the instructions were implemented in a very efficient manner.

Additionally, the present invention provides an apparatus and a method for providing "hints" to the user of the data processing system about transactions which are occurring in the cache memory. For example, a user is provided with data which indicates when one of the cache control instructions listed above is executed. The user may then use the data to control operation of a memory controller, or a similar processing system, to make assumptions about future cache memory transactions. As an example, assume the cache memory provides external data which indicates that a current cache memory transaction is a touch load operation. If a subsequent cache line is to be accessed during the next transaction, the memory controller may then access the subsequent line before it is actually requested, and the effective memory access time is lowered.

By providing user access to control operation of the cache memory and by providing external information indicating a current cache control operation, the present invention provides several mechanisms for enhancing performance of any cache memory.

Figure 1:
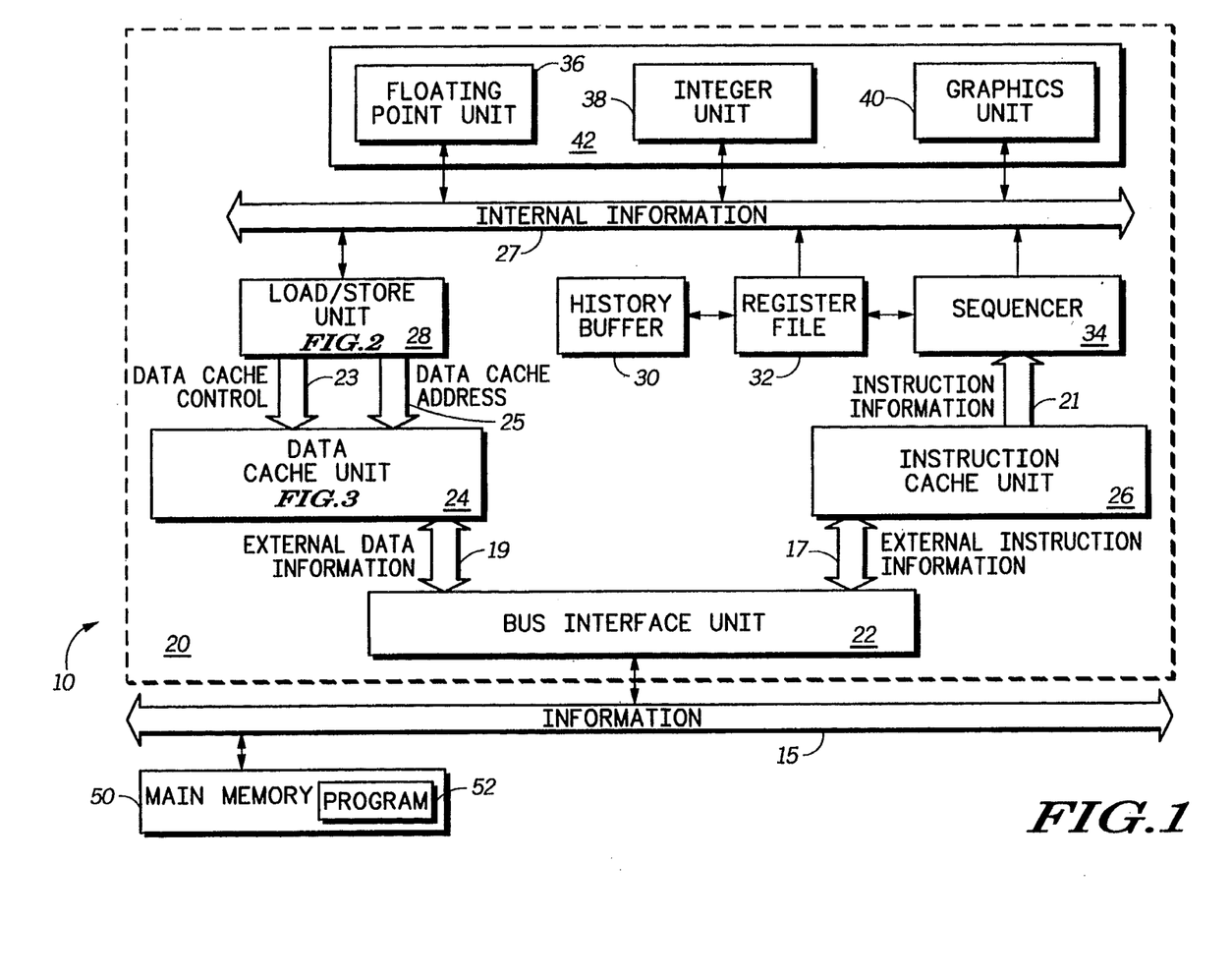
FIG. 1 illustrates in block diagram form a data processing system having a data cache unit in accordance with the present invention.

One implementation of the preferred embodiment is illustrated in FIG. 1. FIG. 1 illustrates a data processing system 10 having a cache memory in accordance with the present invention. Data processing system 10 generally includes a data processor 20 and a main memory 50. An INFORMATION BUS 15 bidirectionally couples data processor 20 and main memory 50 such that data, address, and control information may be communicated between each. A user provided program 52 is stored in main memory 50.

Data processor 20 includes a bus interface unit 22, a data cache unit 24, an instruction cache unit 26, a load/store unit 28, a history buffer 30, a register file 32, a sequencer 34, and an execution unit 42. Execution unit 42 includes a floating point unit 36, an integer unit 38, and a graphics unit 40. In one particular embodiment, data processor 20 may be implemented as a single integrated circuit such as a MC88110 which is available from Motorola, Inc. of Austin, Tex.

Bus interface unit 22 arbitrates between external instruction and data accesses and controls internal accesses of INFORMATION BUS 15. Bus interface unit 22 is bidirectionally coupled to instruction cache unit 26 to provide external instruction information to instruction cache unit 26 via an EXTERNAL INSTRUCTION INFORMATION bus 17. Similarly, bus interface unit 22 is bidirectionally coupled to data cache unit 24 to provide external data information to data cache unit 24 via an EXTERNAL DATA INFORMATION bus 19.

Instruction cache unit 26 is accessed during execution of a software routine, such as software program 52 stored in main memory 50, to quickly provide instructions and reduce an amount of processing time generally required to fetch instructions. Instruction cache unit 26 provides an instruction and a plurality of control signals corresponding to the instruction to sequencer 34 via an INSTRUCTION INFORMATION bus 21.

Sequencer 34 decodes both the instruction and the plurality of control signals to provide a decoded instruction opcode to both execution unit 42 and load/store unit 28 via an INTERNAL INFORMATION bus 27. Additionally,. sequencer 34 decodes the instruction and the plurality of control signals provided by INSTRUCTION INFORMATION bus 21 to access an operand necessary for execution of the instruction from register file 32.

In the implementation of the invention described herein, register file 32 includes thirty-two registers which may be used to store operands and results of each instruction executed by data processor 20. A single register referred to as "r0" always contains a constant value of zero and is not modified during a write operation. In prior art systems, a load to register r0 would result in either an exception or no operation (NOP) at all. By recognizing that a load to register r0 could be decoded to provide a cache control operation, very little additional circuitry is required to enable a user to control over operation of data cache unit 24 in data processor 20.

Register file 32 provides the operand stored therein to both history buffer 30 and to execution unit 42. The information stored in register file 32 is transferred via INTERNAL INFORMATION bus 27.

History buffer 30 is coupled to register file 32 to maintain a queue of each of the instructions which is being executed by data processor 20. History buffer 30 maintains this queue by storing a copy of register contents corresponding to each of the instructions. Typically, an instruction issued by sequencer 34 is placed at the tail of the queue of history buffer 30. The instruction then moves through the queue as previous instructions are completely executed and removed from the queue. When the instruction reaches the head of the queue and has finished execution, the instruction is removed from the queue of history buffer 30. History buffer 30 proves to be very valuable if an exception occurs during execution of any instruction. History buffer 30 is able to restore the contents of register file 32 to a state prior to issuance of the instruction. Therefore, processing time may be lost during an exception, but no erroneous data or catastrophic errors generally occur.

INTERNAL INFORMATION bus 27 is bidirectionally coupled to each of floating point unit 36, integer unit 38, and graphics unit 40 to communicate information necessary for instruction execution. Floating point unit 36 executes operations which require floating point data having varying degrees of precision. Multiplication, division, and addition is performed to fully execute a instructions which manipulate floating point data. Similarly, integer unit 38 executes instructions which operate on integer, or fixed-point, data. Graphics unit 40 provides circuitry for performing functions which are directly related to computer imaging.

Additionally, INTERNAL INFORMATION bus 27 is coupled to load/store unit 28. Load/store unit 28 is coupled to data cache unit 24 via both a DATA CACHE ADDRESS bus 25 and a DATA CACHE CONTROL bus 23.

Load/store unit 28 interfaces with data cache unit 24 and sequencer 34 to execute instructions which access data memory. Load/store unit 28 also sequences execution of the instructions which access the data memory to optimize efficiency of data processor 20. Load/store unit 28 is illustrated in more detail in FIG. 2. Load/store unit 28 generally includes an effective address calculation logic circuit 44, a decode control block 45, a plurality of load buffers 46, address issue multiplexor 48, and a control issue multiplexor 49.

Figure 2:
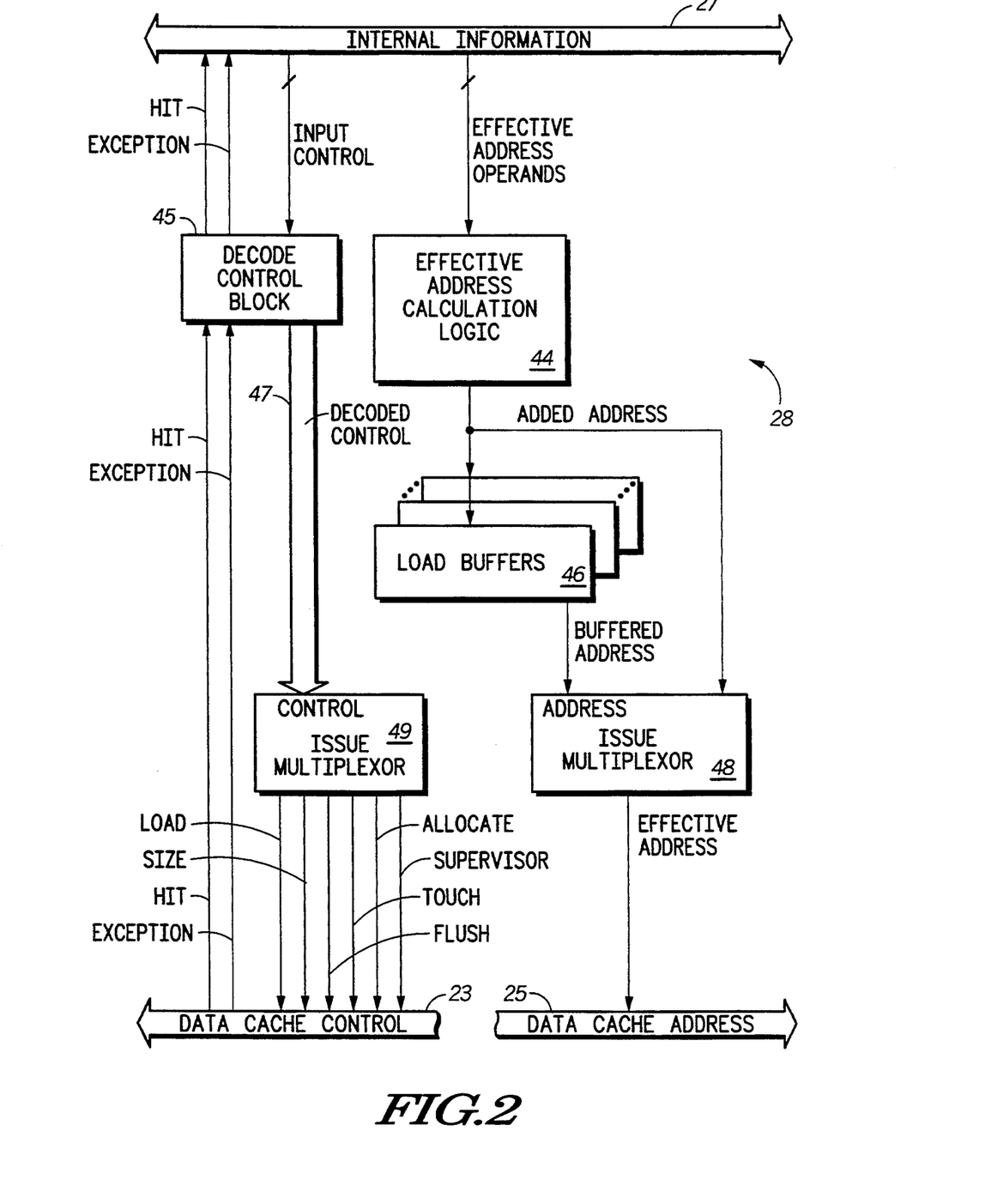
FIG. 2 illustrates in block diagram form a load/store unit of FIG. 1.

INTERNAL INFORMATION bus 27 provides a signal labelled "EFFECTIVE ADDRESS OPERANDS" to effective address calculation logic circuit 44. Effective address calculation logic circuit 42 provides provides a CALCULATED ADDRESS signal to a first input of one of the plurality of load buffers 46 and address issue multiplexor 48.

INTERNAL INFORMATION bus 27 also provides a signal labelled "INPUT CONTROL" to decode control block 45. Decode control block 45 provides a plurality of decoded control signals to control issue multiplexor 49 via a DECODED CONTROL bus 47.

One of the plurality of load buffers 46 provides a second input to address issue multiplexor 48. The second input is provided by a BUFFERED ADDRESS signal. Address issue multiplexor 48 provides an effective address to DATA CACHE ADDRESS bus 25. Additionally, control issue multiplexor 49 provides the plurality of control signals to DATA CACHE CONTROL bus 23. Each of the plurality of control signals is respectively labelled "LOAD," "SIZE," "FLUSH," "TOUCH," "ALLOCATE," and "SUPERVISOR."

Additionally, DATA CACHE CONTROL bus 23 provides a first and a second signal respectively labelled "HIT" and "EXCEPTION" to decode control block 45. Decode control block 45 passes the first and second signals, respectively labelled HIT and EXCEPTION, to INTERNAL INFORMATION bus 27. Operation of load/store unit 28 will be described in more detail below.

Both DATA CACHE CONTROL bus 23 and DATA CACHE ADDRESS bus 25 couple load/store unit 28 to data cache unit 24. Data cache unit 24 generally provides data information accessed during a memory access operation to either a remaining portion of data processor 20 or to an external source such as main memory 50. Data cache unit 24 also receives and provides control information necessary to insure that data stored in data cache 54 is correctly propagated within data processing system 10. Data cache unit 24 is illustrated in greater detail in FIG. 3. Data cache unit 24 generally includes a data cache 54, a data tag array 56, a data cache memory management unit (MMU) 58, and a cache control logic circuit 60.

Figure 3:
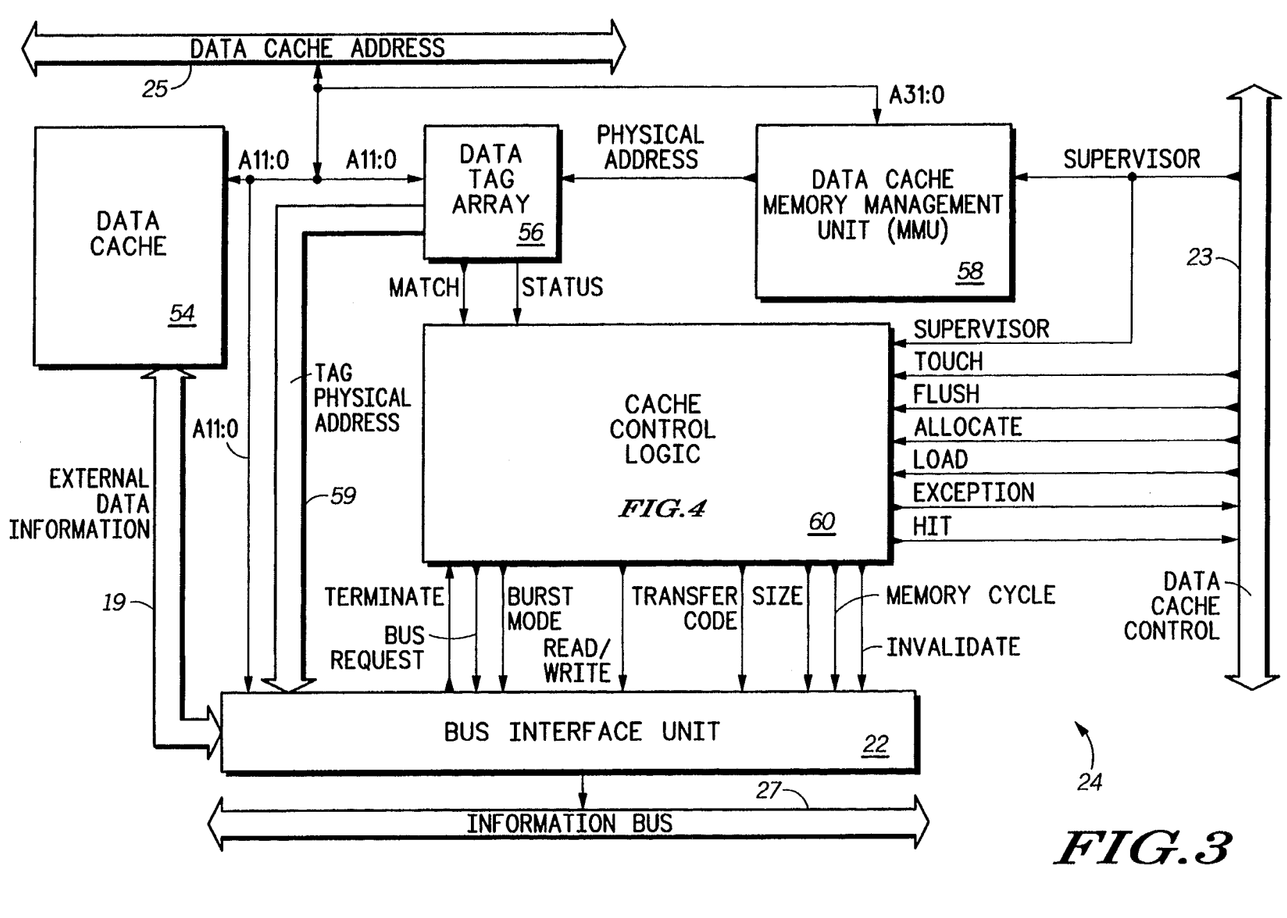
FIG. 3 illustrates in block diagram form a data cache unit of FIG. 1.

DATA CACHE ADDRESS bus 25 provides a plurality of address bits respectively labelled "A0" through "A31" to data cache unit 24. In data cache unit 24, each of the plurality of address bits is provided to data cache MMU 58. Additionally, address bits zero through eleven, respectively labelled "A0" through "A11" are provided to data cache 54, bus interface unit 22, and data tag array 56. An external data value is communicated between data cache 54 and bus interface unit 22 via an EXTERNAL DATA INFORMATION bus 19. Bus interface unit 22 subsequently provides the external data value to an external processor such as main memory 50 via INFORMATION bus 15. An internal data value is also communicated between data cache 54 and a remaining portion of data processor 20. Communication of the internal data value is well known to one with ordinary skill in the art and, therefore, will not tie discussed in further detail. Additionally, communication of the internal data value is not necessary to understanding the embodiment of the invention described herein.

DATA CACHE CONTROL bus 23 also transfers cache control information to data cache unit 24. In data cache unit 24, DATA CACHE CONTROL bus 23 provides the SUPERVISOR signal to data cache MMU 58. Data cache MMU 58 subsequently provides a physical address to an input of data tag array 56 via a PHYSICAL ADDRESS bus 57. The PHYSICAL ADDRESS bus 57 transfers a physical address to data tag array 56.

Data tag array 56 is coupled to cache control logic circuit 60 to provide a first signal labelled "MATCH" and a second signal labelled "STATUS." Additionally, data tag array 56 is coupled to bus interface unit 22 to provide a tag physical address via TAG PHYSICAL ADDRESS bus 59.

DATA CACHE CONTROL bus 23 is also coupled to cache control logic circuit 60 to provide the SUPERVISOR signal. Additionally, the TOUCH, FLUSH, ALLOCATE, and LOAD signals are also provided to cache control logic circuit 60. Cache control logic circuit 60 provides both the EXCEPTION and the HIT signals to load/store unit 28 via DATA CACHE CONTROL bus 23.

Cache control logic circuit 60 is also coupled to bus interface unit 22 via EXTERNAL DATA INFORMATION bus 19 to provide a plurality of output signals respectively labelled "INVALIDATE," "MEMORY CYCLE," "SIZE," "TRANSFER CODE," "READ/WRITE," "BURST MODE," and "BUS REQUEST." Cache control logic circuit 60 also receives a signal labelled "TERMINATE" from EXTERNAL DATA INFORMATION bus 19. Operation of data cache unit 24 will be discussed in more detail below.

Cache control logic circuit 60 receives the SUPERVISOR, TOUCH, FLUSH, ALLOCATE, LOAD, MATCH, and STATUS signals and uses each to generate the plurality of output signals listed above. The plurality of output signals provide information indicating operations currently executed by data processor 20 to an external user. Cache control logic circuit 60 is illustrated in more detail in FIG. 4. Cache control logic circuit 60 includes a data cache filter 62, and a data cache central control circuit 64.

Figure 4:
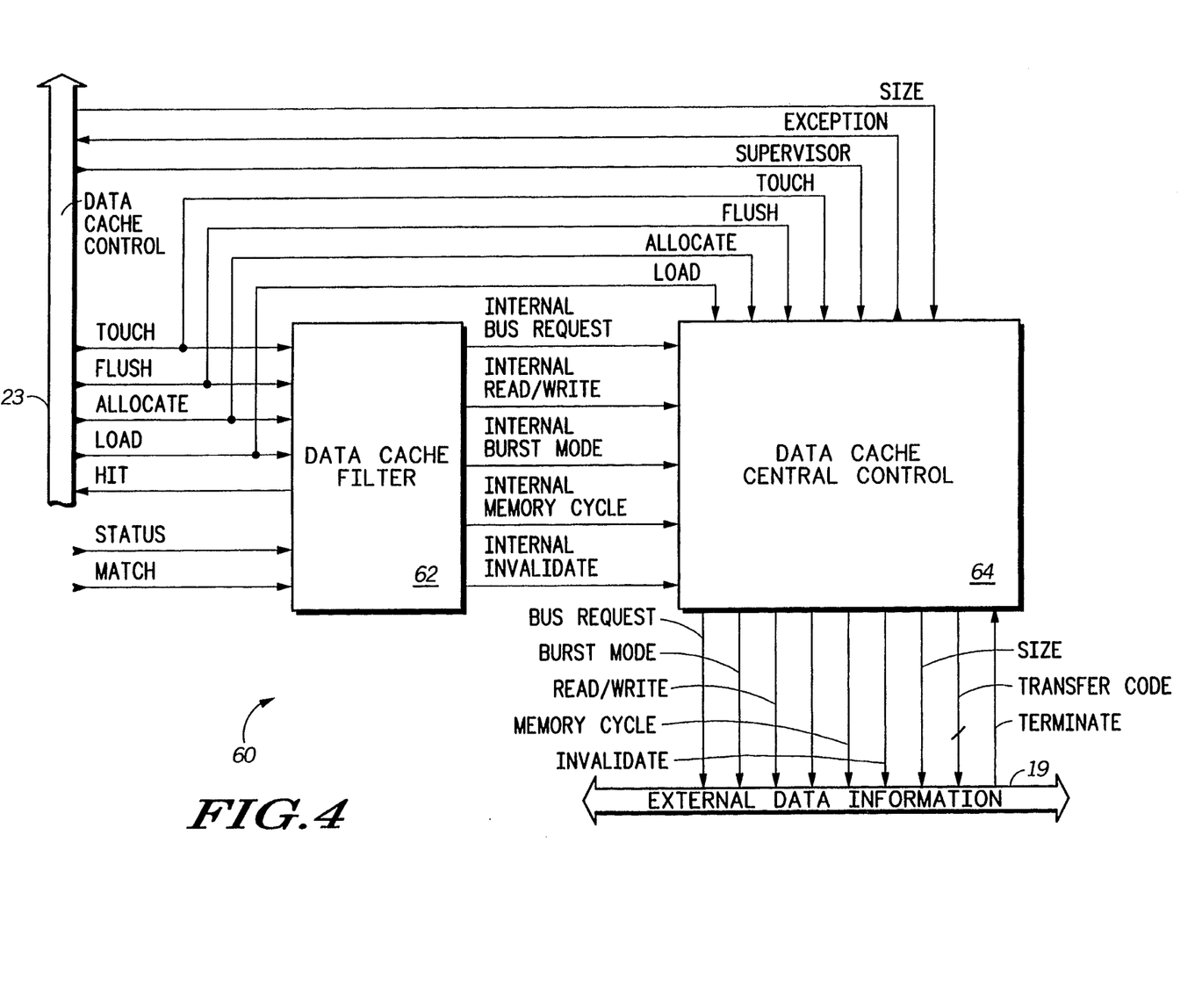
FIG. 4 illustrates in block diagram form a cache control logic of FIG. 3.

DATA CACHE CONTROL bus 23 provides each of the TOUCH, FLUSH, ALLOCATE, and LOAD signals to both data cache filter 62 and to data cache central control circuit 64. Additionally, DATA CACHE CONTROL bus 23 provides the SUPERVISOR signal to data cache central control circuit 64. The STATUS and MATCH signals are also provided to data cache filter 62.

Data cache filter 62 provides a plurality of signals to data cache central control in response to each input signal. A first one of the plurality of signals is labelled "INTERNAL BUS REQUEST." Similarly, a second one of the plurality of signals is labelled "INTERNAL READ/WRITE" and a third one of the plurality of signals is labelled "INTERNAL BURST MODE." A signal labelled "INTERNAL MEMORY CYCLE" and a signal labelled "INTERNAL INVALIDATE" respectively include the fourth and fifth ones of the plurality of signals.

Data cache central control 64 provides each of a BUS REQUEST, a BURST MODE, a READ/WRITE, a MEMORY CYCLE, an INVALIDATE, a SIZE, and a TRANSFER CODE signal to bus interface unit 22 via EXTERNAL DATA INFORMATION bus 19. Similarly, EXTERNAL DATA INFORMATION bus 19 communicates the TERMINATE SIGNAL to data cache central control circuit 64. Additionally, data cache central control circuit 64 provides the EXCEPTION signal to load/store unit 28 via DATA CACHE CONTROL bus 23.

In the implementation of the invention as described herein, the touch load, flush load, and allocate load operations are each executed by a load operation to register r0. Each operation is further defined by a size suffix. For example, an instruction mnemonic of the form, 1d.b r0, <ea>, indicates that a touch load operation should be executed. Therefore, a byte size load to register r0 corresponds to a touch load operation. Similarly, an instruction mnemonic of the form, 1d.w r0, <ea>, indicates that a flush load operation is to be executed and an instruction mnemonic of the form, 1d.h r0, <ea>, indicates that an allocate load operation should be performed. Again, a word size load and a half-word size load correspond to a flush load and an allocate load operation, respectively. Execution of the flush load and allocate load operations will be subsequently discussed in more detail.

During operation of data processor 20, instruction cache unit 26, sequencer 34, register file 32, and history buffer 30, function to control operation of data processor 20 such that a correct flow of information between memory storage locations and execution unit 42 is achieved.

Instruction cache unit 26 fetches instructions from an internal instruction cache (not shown) as dictated by a flow of a program which is being executed by data processor 20. The instruction cache unit 26 then provides the instructions to sequencer 34. For example, during execution of a touch load operation, instruction cache unit 26 fetches an instruction of the form 1d.b r0, <ea>. The 1d.b r0, <ea> is a mnemonic representation of the touch load instruction. A binary representation is actually provided to instruction cache unit 26.

Sequencer 34 then decodes and executes the instruction in a sequence determined by the flow of the program executed by data processor 20. Necessary operands of the decoded instruction are accessed, or "fetched," from register file 32 and provided to both execution unit 42 and load/store unit 28 via INTERNAL INFORMATION bus 27. Sequencer 34 also determines whether data processor 20 is operating in a user or a supervisor mode of operation. Additionally, sequencer 34 determines whether an exception should be issued in response to execution of the instruction. Supervisor and user modes are disclosed more fully in U.S. Pat. No. 3,858,182 by Bruce A. Delagi et al, which is hereby incorporated by reference herein.

Sequencer 34 and register file 32 respectively provide the decoded instruction and necessary operand information to both execution unit 42 and load/store unit 28 via INTERNAL INFORMATION bus 27. During execution of cache control operations described herein, execution unit 42 is not accessed. However, if the decoded instruction did access a component of execution unit 42, the instruction would be provided to either floating point unit 36, integer unit 38, or graphics unit 40.

During execution of one of the plurality of cache control operation described herein, the instruction accesses a storage location in data cache unit 24. The storage location is an effective address (<ea>) specified in the mnemonic form of the instruction. Therefore, data information necessary to access that location is provided to load/store unit 28 via INTERNAL INFORMATION bus 27.

Control and data information necessary to access the storage location are respectively provided to effective address calculation logic 44 and decode control block 45 via INTERNAL INFORMATION bus 27. The EFFECTIVE ADDRESS OPERAND signal is provided to effective address calculation logic circuit 44. Effective address calculation logic circuit 44 provides a calculated address. The calculated address may be formed by adding the contents of two registers in register file 32 together. Similarly, the calculated address may be formed by adding a constant value to a value stored in a register. Many other variations are also used to generate the calculated address. Such variations are common, however, and should be well known to one with ordinary skill in the art.

The calculated address is provided to both the address issue multiplexor 48 and to a predetermined one of the plurality of load buffers 46. Concurrently, decode control block 45 receives an INPUT CONTROL signal from sequencer 34 via INTERNAL INFORMATION bus 27. The INPUT CONTROL signal transfers control information generated by sequencer 34 in response to the touch load instruction. The INPUT CONTROL signal is decoded by decode control block 45 to provide a plurality of decoded control signals to control issue multiplexor 49 via a DECODED CONTROL bus 47.

Load buffers 46 are provided to store the calculated address in a queue until address issue multiplexor 48 is able to issue it to data cache unit 24. Each one of the plurality of load buffers 48 is coupled to address issue multiplexor 48 to provide both a BUFFERED ADDRESS signal. Address issue multiplexor 48 issues either the calculated address or the BUFFERED ADDRESS signal as the effective address depending on the queue of address values. The EFFECTIVE ADDRESS SIGNAL is provided to data cache unit 24 via a DATA CACHE ADDRESS bus 25.

Control issue multiplexor 49 also issues control information corresponding to the effective address. In the implementation of the invention described herein, the control information includes the SUPERVISOR, SIZE, LOAD, TOUCH, FLUSH, and ALLOCATE signals which are transferred via DECODED CONTROL bus 47.

During execution of one of the cache control operations, the SUPERVISOR signal is provided to indicate a mode of operation in which data processor 20 is operating. Assume in the example described herein that the SUPERVISOR signal is negated to indicate that data processor 20 is operating in a user mode. In user mode, access of data cache unit 24 is restricted to only a small portion of memory referred to as "user memory" and a limited number of registers in register file 32. Additionally, the touch load operation may also be executed in the supervisor mode of operation. If the SUPERVISOR signal is asserted, data processor 20 is operating in the supervisor mode of operation. In the supervisor mode of operation, access to data cache unit 24 and register file 32 is unrestricted. A logic state of the SUPERVISOR signal is determined by sequencer 34 and provided to load/store unit 28 via INTERNAL INFORMATION bus 27.

The SIZE signal indicates whether a memory access should be in byte, halfword, word, or double word increments. The SIZE signal is typically encoded in the instruction opcode provided by instruction cache unit 16.

The LOAD signal is provided to data cache unit 24 to indicate whether an instruction currently executed by data processor 20 is a load or store operation. The LOAD signal is asserted during a load operation and negated during a store operation. Because each of the cache control operations is a load operation, the LOAD signal is asserted.

Each of the FLUSH, TOUCH, and ALLOCATE signals indicates whether one of the cache control operations previously described has been initiated by an instruction and should be executed. The FLUSH, TOUCH, and ALLOCATE signals correspond to the flush load, touch load, and allocate load instructions, respectively.

Each of the control signals described above is subsequently provided to data cache unit 24 via DATA CACHE CONTROL bus 23. Similarly, the effective address is provided to data cache unit 24 via DATA CACHE ADDRESS bus 25.

As illustrated in FIG. 3, data cache MMU 58 processes bits zero through thirty-one of the effective address in accordance with the logic state of the SUPERVISOR signal to translate the effective address to a physical address. The physical address is subsequently transferred to data tag array 56 via the PHYSICAL ADDRESS bus 57. Data cache MMU 58 provides two logical address spaces (not shown). A first address space is for supervisor data and a second address space is for user data. An address translation cache (not shown) in data cache memory MMU 58 translates the effective address to the physical address. The details of operation of data cache MMU 58 are not necessary for understanding of the present invention.

The physical address is then used to access a predetermined memory location in data tag array 56. Bits zero through eleven of the effective address are decoded to locate the predetermined memory location in data tag array 56. A data value stored at the predetermined memory location is then compared with bits twelve through thirty-one of the physical address. If identical, data tag array 56 asserts the MATCH signal. Similarly, a status of the data value stored at the memory location is provided via the STATUS signal.

The status of the data value may be either invalid, shared unmodified, exclusive modified, or exclusive unmodified. If the status of the data value is invalid, the data value is not the same as a corresponding value in main memory 50. If the status of the data value in data cache 54 is shared unmodified, the data value is shared among other processors (not shown) which are external to data processor 20. However, the data value is the same as a corresponding value in main memory 50. If the status of the data value in data cache 54 is exclusive modified, only data processor 20 has a copy of the data value. No external processor may access the data value. Additionally, because the data value is modified, the data value is "dirty," or different than a corresponding value in main memory 50. Lastly, if the status of the data value is exclusive unmodified, only data processor 20 has a copy of the data value, and the data value is the same as a corresponding value in main memory 50.

Each of the MATCH, STATUS, SUPERVISOR, SIZE, LOAD, TOUCH, FLUSH, and ALLOCATE signals is provided to cache control logic circuit 60. Cache control logic circuit 60 processes each of the control signals to provide a plurality of control signals which indicate internal operation of data cache unit 24.

As illustrated in FIG. 4, DATA CACHE CONTROL bus 23 provides the TOUCH, FLUSH, ALLOCATE, and LOAD signals to data cache filter 62. Additionally, the STATUS and MATCH signals are also provided to data cache filter 62 by data tag array 56. Data cache filter 62 processes each input to provide a plurality of outputs.

A first output of data cache filter 62 is the HIT signal. The HIT signal is provided in response to both the STATUS and MATCH signals to indicate whether the data value accessed by load/store unit 24 is stored in data cache 54 or should be accessed from main memory 50. The HIT signal is provided back to sequencer 34 via load/store unit 28 and the INTERNAL INFORMATION bus 27 to indicate a subsequent operation which should be executed.

The HIT signal is only asserted if data is already stored in data cache 54 at the effective address of the cache control operation. Conversely, if the HIT signal is negated, data is not stored in data cache 54 at the effective address of the cache control operation.

Data cache filter 62 subsequently asserts a second output, the INTERNAL BUS REQUEST signal, to data cache central control circuit 64. During operation, data cache central control circuit 64 drives each input to bus interface unit 22 in a sequential manner. Therefore, when the INTERNAL BUS REQUEST signal is provided to data cache central control circuit 64, central control 64 drives the BUS REQUEST signal to bus interface unit 22 via EXTERNAL DATA INFORMATION bus 19. The INTERNAL BUS REQUEST signal indicates whether data processor 20 should request ownership of INFORMATION bus 15. If the INTERNAL BUS REQUEST signal is asserted, data processor 20 is executing an operation which requires information from an external memory source. Similarly, if the INTERNAL BUS REQUEST signal is negated, data processor 20 is not executing an operation which requires an access to either main memory 50 or another data processor (not shown).

Additionally, during execution of the cache control operation, a third output of data cache filter 62 asserts a signal labelled INTERNAL READ/WRITE. The INTERNAL READ/WRITE signal indicates whether data processor is executing an operation which either reads a data value from or writes a data value to a memory location. Again, data cache central control circuit 64 drives the INTERNAL READ/WRITE signal to the EXTERNAL DATA INFORMATION bus 19 as the READ/WRITE signal.

Data cache filter 62 also asserts the INTERNAL BURST MODE signal as a fourth output during execution of the cache control operation. When the INTERNAL BURST MODE signal is asserted, data processor 20 is able to either read or write an entire line of data stored in main memory 50 during a burst transaction. If the INTERNAL BURST MODE signal is negated, data processor 20 simply reads data with a size boundary as determined by the SIZE signal.

A fifth output of data cache filter 62 is labelled "INTERNAL MEMORY CYCLE." The INTERNAL MEMORY CYCLE signal is driven to EXTERNAL DATA INFORMATION bus 19 as the MEMORY CYCLE signal by data cache central control circuit 64. The MEMORY CYCLE signal is asserted to indicate that data processor 20 is transferring between data cache unit 24 and main memory 50. When the MEMORY CYCLE signal is negated, an invalidate operation is executed and no data is transferred. During the invalidate operation, valid data is provided by data processor 20, but neither data cache unit 24 nor main memory 50 is required to execute a data write operation.

Additionally, data cache filter 62 provides a sixth output signal labelled "INTERNAL INVALIDATE." Data cache central control 64 drives the INTERNAL INVALIDATE signal to EXTERNAL DATA INFORMATION bus 19 as the INVALIDATE signal. When the INVALIDATE signal is asserted, other cache memory systems (not shown) in data processing system 10 invalidate their internal cache line corresponding to the accessed data value. If their HIT signals are asserted and the STATUS signal indicates that the cache line to be modified in data cache 54 is modified, the cache line should be copied to main memory 50 before being invalidated.

Upon receipt of each of the BUS REQUEST, BURST MODE, READ/WRITE, MEMORY CYCLE, and INVALIDATE signals, main memory 50 provides the data located at the physical address generated by data cache MMU 58. The data is transferred from main memory 50 to bus interface unit 22 via INFORMATION bus 15. Subsequently, the data is transferred to and stored in data cache 54 at the address specified by the physical address.

Should an error occur, bus interface unit 22 would assert the TERMINATE signal to indicate that a bus cycle was terminated and an exception occurred. Bus interface unit 22 would subsequently provide the TERMINATE signal to data cache central control circuit 64 via EXTERNAL DATA INFORMATION bus 19. The TERMINATE signal indicates both that a bus timing cycle was completed and a status of the bus cycle. For example, the status of the bus cycle might indicate that an exception occurred. If the asserted TERMINATE signal indicated that an exception occurred, data cache central control circuit 64 would assert the EXCEPTION signal and provide it to load-/store unit 28. Load/store unit 28 subsequently passes the EXCEPTION signal to sequencer 34 to indicate that the error occurred.

Figure 5:
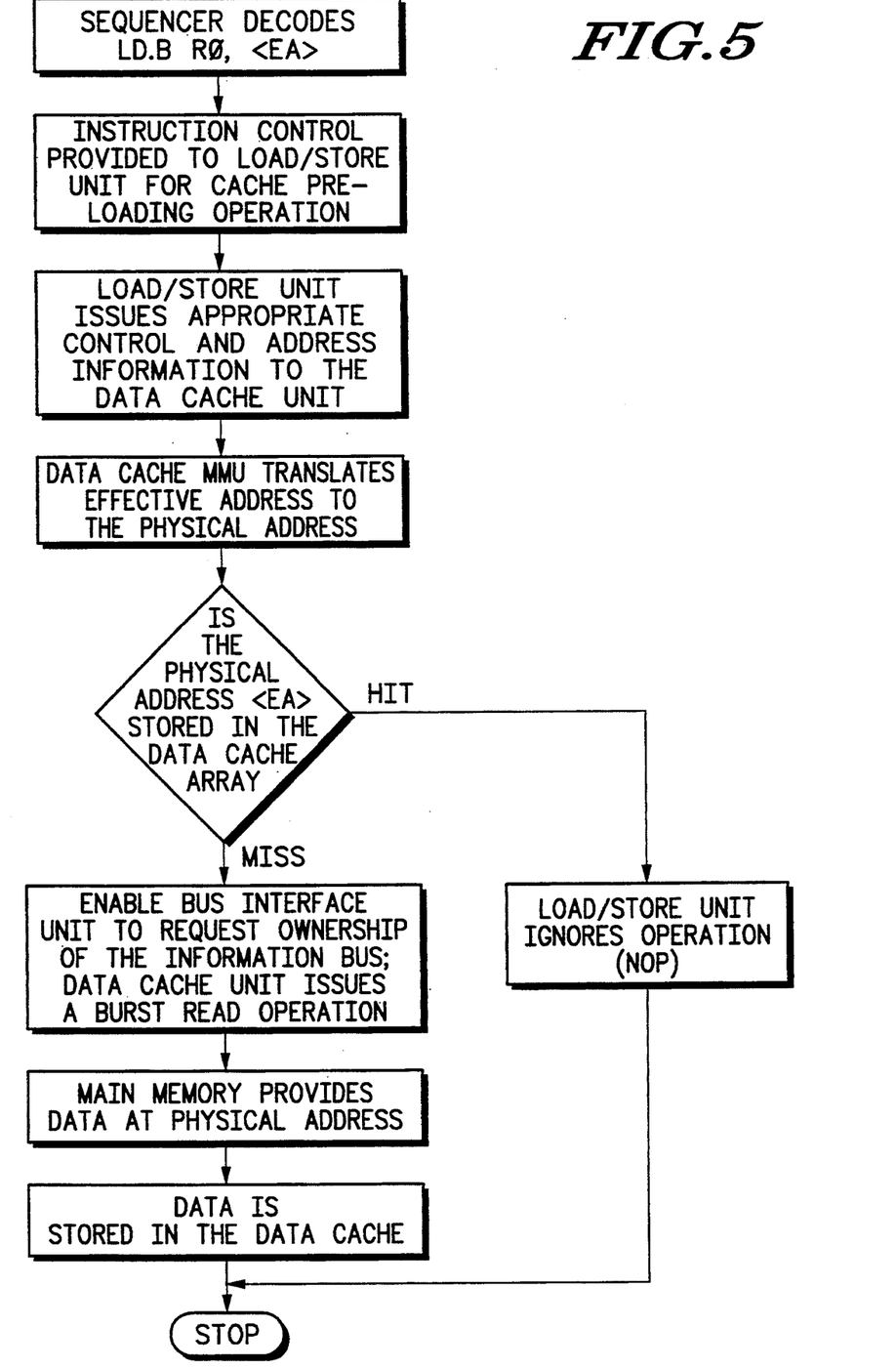
FIG. 5 illustrates in flow chart form a series of steps executed during a cache touch load operation in accordance with the present invention.

FIG. 5 illustrates a flow chart of the steps required to execute a touch load cache control operation in the embodiment of the invention illustrated in FIG. 1 through FIG. 4. As previously described, a touch load instruction allows data to be loaded into data cache 54 by a user. In this implementation, the touch load cache control operations fetches the data and stores it in data cache 54 before it is actually required. Therefore, when the data is accessed, data cache 54 is able to provide the data with no delays.

In the implementation of the invention as described herein, the touch load has an instruction opcode of the form, 1d.b r0, <ea>. During execution of a touch load operation, instruction cache unit 26 fetches an instruction with a mnemonic, 1d.b r0, <ea>. Sequencer 34 then fully decodes the binary representation of the 1d.b r0, <ea> mnemonic and executes the touch load instruction in a sequence determined by the flow of the program executed by data processor 20. Necessary operands of the decoded instruction are accessed, or "fetched," from register file 32 and provided to both execution unit 42 and load/store unit 28 via INTERNAL INFORMATION bus 27.

Sequencer 34 and register file 32 respectively provide the decoded touch load instruction and necessary operand information to both execution unit 42 and load-/store unit 28 via INTERNAL INFORMATION bus 27. During execution of the touch load instruction, data cache unit 24 is accessed. The storage location is an effective address (<ea>) specified in the touch load instruction.

Control and data information necessary to access the storage location are subsequently provided to load-/store unit 28. Both the effective address accessed during the touch load operation and the control information corresponding to the effective address signal are provided to data cache unit 24. As previously described, the control information includes the SUPERVISOR, SIZE. LOAD, TOUCH, FLUSH, and ALLOCATE signals.

During execution of the touch load operation, the SUPERVISOR signal provided to indicate a mode of operation in which data processor 20 is operating. Assume in the example described herein that the SUPERVISOR signal is negated to indicate that data processor 20 is operating in a user mode. Additionally, the touch load operation may also be executed in the supervisor mode of operation. If the SUPERVISOR signal is asserted, data processor 20 is operating in the supervisor mode of operation. The SIZE signal indicates that a byte access is specified in the 1d.b r0, <ea>instruction. As the touch load operation is a load operation, the LOAD signal is asserted. Additionally, the TOUCH signal is asserted to indicate that a touch load operation is being executed.

Data cache MMU 58 processes bits zero through thirty-one of the effective address to translate the effective address to a physical address transferred by the PHYSICAL ADDRESS bus 57. The physical address is then used to access a predetermined memory location in data tag array 56. Bits zero through eleven of the effective address are decoded to locate a predetermined memory location in data tag array 56. A data value stored at the predetermined memory location is then compared with bits twelve through thirty-one of the physical address. If identical, data tag array 56 asserts the MATCH signal. Similarly, a status of the data value stored at the memory location specified by the physical address is provided via the STATUS signal.

A HIT signal is provided in response to both the STATUS and MATCH signals to indicate whether the data value accessed by load/store unit 24 is stored in data cache 54 or should be accessed from main memory 50. The HIT signal is provided back to sequencer 34 via load/store unit 28 and the INTERNAL INFORMATION bus 27 to indicate a subsequent operation which should be executed.

If the HIT signal is asserted during execution of the touch load instruction, cache control logic circuit 60 does not execute the operation. The HIT signal is asserted when the data is already stored in data cache 54 at the effective address specified in the touch load instruction. Therefore, a new data value is not needed. However, if the HIT signal is negated during execution of the touch load instruction, cache control logic circuit 60 is enabled to provide the control and data information necessary to execute the touch load instruction.

Load/store unit 28 provides the SUPERVISOR, SIZE, LOAD, TOUCH, FLUSH, and ALLOCATE signals to enable cache control logic circuit 60 to execute the touch load operation. Cache control logic circuit 60 processes each of the control signals to provide a plurality of control signals which indicate internal operation of data cache unit 24.

Cache control logic circuit 60 asserts the BUS REQUEST signal to request ownership of INFORMATION bus 15. Cache control logic circuit 60 also asserts the READ/WRITE signal to indicate that data processor 20 is executing an operation which reads a data value from main memory 50. Additionally, the BURST MODE signal is asserted to enable data processor 20 to read a line of data from main memory 50 during execution of the touch load instruction. The MEMORY CYCLE signal is asserted to indicate that data processor 20 is transferring data between data cache unit 24 and main memory 50. The INVALIDATE signal is negated as neither main memory 50 nor other data processors (not shown) in data processing system 10 should invalidate corresponding copies of the data. Upon receipt of each of the BUS REQUEST, BURST MODE, READ/WRITE, MEMORY CYCLE, and INVALIDATE signals, main memory 50 provides data to data cache 54 at the physical address generated by data cache MMU 58. Therefore, by issuing a touch load instruction of the form, ld.b r0, <ea>, a user may specify a data value to be stored in data cache 54. Normally, data is stored in a cache only when the data is needed. Subsequently, instruction stalls due to dependencies on data which must be provided by external memory sources result in poor performance. By executing a touch load instruction to store data in the cache before it is actually needed, the latency of retrieving the data from the external memory may be overlapped with concurrently executed useful functions to minimize processing time wasted due to instruction stalls.

Although not elaborated herein, a touch load instruction never generates an exception. Therefore, a touch load instruction may be retired from history buffer 30 as soon as it enters data cache unit 24. Additionally, a value loaded during execution of a touch load instruction is not written back to register file 32. During typical load operations, the data value loaded to data cache 54 is written back to register file 32 for use in subsequent operations. However, the touch load instruction does not require that the data loaded at the effective address specified in the instruction be written back to register file 32. Therefore, processing time is again minimized.

Figure 6:
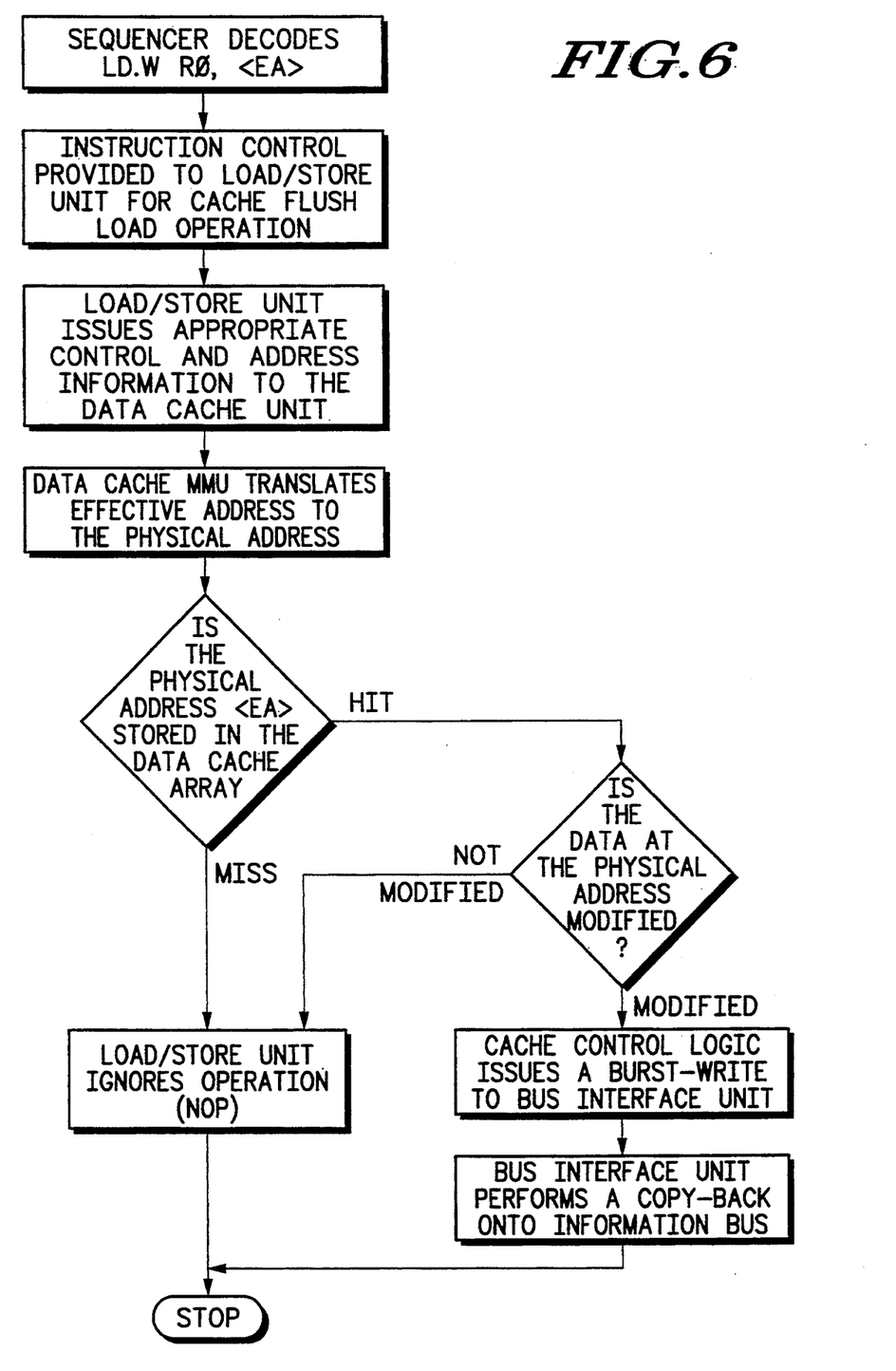
FIG. 6 illustrates in flow chart form a series of steps executed during a cache flush load operation in accordance with the present invention.

FIG. 6 illustrates a flow chart of the steps required to execute a flush load cache control operation in data processor 20. As previously described, a flush load instruction forces a dirty cache line in data cache 54 to be written to main memory 50. In prior art systems, dirty cache lines are "copied back" to main memory 50 only as a side effect of needing to allocate a new line in data cache 54. Sometimes, however, it is convenient to be able to flush data in data cache 54 to immediately update information stored in main memory 50. In one implementation, the flush load instruction allows the user to perform multiple store operations to a line in data cache 54, and then write the data to main memory 50 in a single burst transaction. The flush load instruction may be executed more efficiently in a user mode of operation. To operate in the supervisor mode of operation, data processor 20 would be required to execute a series of time consuming instructions. Therefore, the overhead time required to execute a flush load would be substantially increased.

In the implementation of the invention as described herein, the flush load has an instruction opcode of the form, ld.w r0, <ea>. During execution of a flush load operation, instruction cache unit 26 fetches an instruction of the form ld.w r0, <ea>. Sequencer 34 then fully decodes the ld.w r0, <ea> instruction and executes the flush load instruction in a sequence determined by the flow of the program executed by data processor 20. Necessary operands of the decoded instruction are accessed, or "fetched," from register file 32 and provided to both execution unit 42 and load/store unit 28 via INTERNAL INFORMATION bus 27. Sequencer 34 and register file 32 respectively provide the decoded flush load instruction and necessary operand information to both execution unit 42 and load/store unit 28 via INTERNAL INFORMATION bus 27. During execution of the flush load instruction, a storage location of data cache unit 24 is accessed. The storage location is the effective address (<ea>) specified in the flush load instruction.

Control and data information necessary to access the storage location are subsequently provided to load/store unit 28. Both the effective address accessed during the flush load operation and the control information corresponding to the effective address signal are provided to data cache unit 24. As previously described, the control information includes the SUPERVISOR, SIZE, LOAD, TOUCH, FLUSH, and ALLOCATE signals.

During execution of the flush load operation, the SUPERVISOR signal provided to indicate a mode of operation in which data processor 20 is operating. Assume in the example described herein that the SUPERVISOR signal is negated to indicate that data processor 20 is operating in a user mode. Additionally, the flush load operation may also be executed in the supervisor mode of operation. If the SUPERVISOR signal is asserted, data processor 20 is operating in the supervisor mode of operation. The SIZE signal indicates that a word access is specified in the ld.w r0, <ea> instruction. As the flush load operation is a load operation, the LOAD signal is asserted. Additionally, the FLUSH signal is asserted to indicate that a flush load operation is being executed.

Data cache MMU 58 processes bits zero through thirty-one of the effective address to translate the effective address to a physical address transferred by the PHYSICAL ADDRESS bus 57. The physical address is then used to access a predetermined memory location in data tag array 56. Bits zero through eleven of the effective address are decoded to locate a predetermined memory location in data tag array 56. A data value stored at the predetermined memory location is then compared with bits twelve through thirty-one of the physical address. If identical, data tag array 56 asserts the MATCH signal. Similarly, a status of the data value stored at the memory location specified by the physical address is provided via the STATUS signal.

A HIT signal is provided in response to both the STATUS and MATCH signals to indicate whether the data value accessed by load/store unit 24 is stored in data cache 54 or should be accessed from main memory 50. The HIT signal is provided back to sequencer 34 via load/store unit 28 and the INTERNAL INFORMATION bus 27 to indicate a subsequent operation which should be executed.

If the HIT signal is negated during execution of the flush load instruction, cache control logic circuit 60 does not execute the operation. Cache control logic circuit 60 does not execute the flush load instruction because the data specified by the effective address is not stored in data cache 54. Therefore, data does not exist to be written to main memory 50. However, if the HIT signal is asserted, the STATUS of the signal is checked to determine if the data stored therein has been modified. If the data has not been modified, then cache control logic circuit 60 does not execute the operation. The data is the same as that stored at a corresponding location in main memory 50. Therefore, a new copy does not need to be stored in main memory 50.

Load/store unit 28 provides the SUPERVISOR, SIZE, LOAD, TOUCH, FLUSH, and ALLOCATE signals. These signals enable cache control logic circuit 60 to execute the flush load operation if the data has been modified. Cache control logic circuit 60 processes each of the control signals to provide a plurality of control signals which control internal operation of data cache unit 24.

Cache control logic circuit 60 asserts the BUS REQUEST signal to request ownership of INFORMATION bus 15. Cache control logic circuit 60 also negates the READ/WRITE signal to indicate that data processor 20 is executing an operation which writes a data value to main memory 50. Additionally, the BURST MODE signal is asserted to enable data processor 20 to read a line of data from main memory 50 during execution of the flush load instruction. The MEMORY CYCLE signal is asserted during execution of the flush load instruction to indicate that data processor 20 is transferring data between data cache unit 24 and main memory 50. As well, a status of the data value is modified. Therefore, the INVALIDATE signal is asserted to enable main memory 50 and other data processors (not shown) in data processing system 10 to invalidate corresponding copies of the data.

Upon receipt of each of the BUS REQUEST, BURST MODE, READ/WRITE, MEMORY CYCLE, and INVALIDATE signals, main memory 50 stores data provided by data cache 54 at the physical address generated by data cache MMU 58.

Therefore, by issuing a flush load instruction of the form 1d.w r0, <ea>, a user may specify a data cache value to be written to main memory 50 without the longer processing times generally required by a supervisor mode of operation. To operate in the supervisor mode of operation, data processor 20 would be required to execute a series of time consuming instructions. Therefore, the overhead time required to execute a flush load would be substantially increased.

Figure 7:
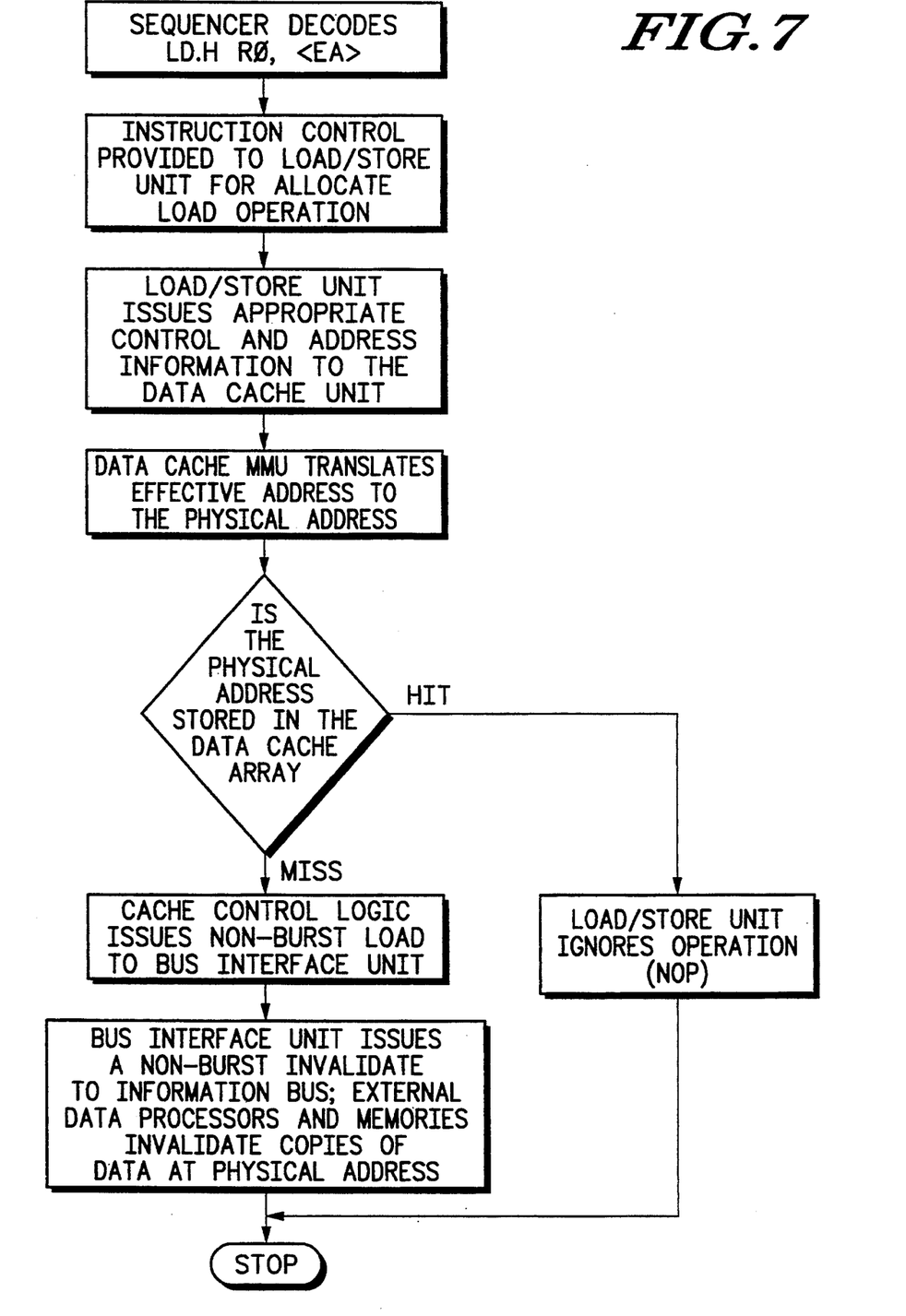
FIG. 7 illustrates in flow chart form a series of steps executed during a cache allocate load operation in accordance with the present invention.

FIG. 7 illustrates a flow chart of the steps required to execute an allocate load cache control operation in data processor 20. In prior art data processors, store operations which accessed a cache memory required a line fill operation to provide a data value to an address specified by the store operation. However, in the implementation of the invention described herein, an allocate load instruction allows a user to allocate a line in data cache 54 for a series of subsequent store operations while avoiding a normal line fill operation from main memory 50. Therefore, processing time associated with fetching a new line from main memory 50 during a store operation is minimized.

In the implementation of the invention as described herein, the allocate load has an instruction opcode of the form, 1d.h r0, <ea>. During execution of a flush load operation, instruction cache unit 26 fetches an instruction of the form 1d.h r0, <ea>. Sequencer 34 then fully decodes the 1d.h r0, <ea> instruction and executes the flush load instruction in a sequence determined by the flow of the program executed by data processor 20. Necessary operands of the decoded instruction are accessed, or "fetched," from register file 32 and provided to both execution unit 42 and load/store unit 28. Additionally, as in execution of the touch load instruction, no exceptions are ever recognized. Therefore, the allocate load instruction is retired from history buffer 30 as soon as execution of the instruction is initiated.

Sequencer 34 and register file 32 respectively provide the decoded allocate load instruction and necessary operand information to both execution unit 42 and load/store unit 28 via INTERNAL INFORMATION bus 27. During execution of the allocate load instruction, data cache unit 24 is accessed. The storage location is an effective address (<ea>) specified in the allocate load instruction.

Control and data information necessary to access the storage location are subsequently provided to load/store unit 28. Both the effective address accessed during the allocate load operation and the control information corresponding to the effective address signal are provided to data cache unit 24. As previously described, the control information includes the SUPERVISOR, SIZE, LOAD, TOUCH, FLUSH, and ALLOCATE signals.

During execution of the allocate load operation, the SUPERVISOR signal is provided to indicate a mode of operation in which data processor 20 is operating. Assume in the example described herein that the SUPERVISOR signal is negated to indicate that data processor 20 is operating in a user mode. Additionally, the allocate load operation may also be executed in the supervisor mode of operation. If the SUPERVISOR signal is asserted, data processor 20 is operating in the supervisor mode of operation. The SIZE signal indicates that a half-word access is specified in the 1d.h r0, <ea> instruction. As the allocate load operation is a load operation, the LOAD signal is asserted. Additionally, the ALLOCATE signal is asserted to indicate that an allocate load operation is being executed.

Data cache MMU 58 processes bits zero through thirty-one of the effective address to translate the effective address to a physical address transferred by the PHYSICAL ADDRESS bus 57. The physical address is then used to access a predetermined memory location in data tag array 56. Bits zero through eleven of the effective address are decoded to locate a predetermined memory location in data tag array 56. A data value stored at the predetermined memory location is then compared with bits twelve through thirty-one of the physical address. If identical, data tag array 56 asserts the MATCH signal. Similarly, a status of the data value stored at the memory location specified by the physical address is provided via the STATUS signal is asserted to operate data processor 20 in a user mode of operation.

A HIT signal is provided in response .to both the STATUS and MATCH signals to indicate whether the data value accessed by load/store unit 24 is stored in data cache 54 or should be accessed from main memory 50. The HIT signal is provided back to sequencer 34 via load/store unit 28 and the INTERNAL INFORMATION bus 27 to indicate a subsequent operation which should be executed.

If the HIT signal is asserted during execution of the allocate load instruction, cache control logic circuit 60 does not execute the operation. Cache control logic circuit 60 does not execute the allocate load instruction because the data specified by the effective address is already stored in data cache 54 and a new line does not have to be allocated.

Load/store unit 28 provides the SUPERVISOR, SIZE, LOAD, TOUCH, FLUSH, and ALLOCATE signals to cache control logic circuit 60. If the HIT signal is negated, cache control logic circuit 60 is enabled to provide a plurality of control signals necessary to execute the allocate load operation. Cache control logic circuit 60 processes each of the control signals to provide the plurality of control signals which indicate internal operation of data cache unit 24.

Cache control logic circuit 60 asserts the BUS REQUEST signal to request ownership of INFORMATION bus 15. Cache control logic circuit 60 also asserts the READ/WRITE signal to indicate that data processor 20 is executing an operation which reads a data value from main memory 50. The BURST MODE signal is negated such that only a half-word of data may be accessed from main memory 50 in a single bus transaction. If the BURST MODE signal had been asserted, a line of data from main memory 50 would have been retrieved. A read of the line of data would require at least four bus cycles to complete. Therefore, the allocate load instruction saves a significant amount of processing time when compared with prior art solutions.

The MEMORY CYCLE signal is also negated during execution of the allocate load instruction to indicate that data processor 20 is not transferring data between data cache unit 24 and main memory 50. The INVALIDATE signal is asserted to enable main memory 50 and other data processing systems (not shown) in data processing system 10 invalidate copies of the allocated line such that data coherency is maintained throughout the entire system.

Therefore, by issuing an allocate load instruction of the form 1d.h r0, <ea>, a user may specify a line in data cache 54 be allocated without requiring a line fill operation and the corresponding processing time typically required. In cases where it is known in advance that an entire line of a cache is going to be entirely overwritten, performance of the data processing system can be improved if a new line of data is not fetched from an external memory source. In data processing system 10, the allocate load instruction allocates a line in data cache 54 as would be executed in a typical load operation which "missed". However, during execution of the allocate load instruction, no data is retrieved to execute a line fill operation and processing overhead is minimized.

Each of the touch load, flush load, and allocate load instructions is implemented without the addition of a significant amount of circuitry. A load instruction with a destination operand of register r0 is used to indicate that a cache control operation is initiated. The size operators, .b, .w, and .h, are then used to indicate whether the cache control operation is a touch load, a flush load, or an allocate load. Therefore, greater control of the operation of data cache 54 is implemented without the addition of more opcodes and the overhead required to support each of the opcodes. In prior art implementations, each of the touch load, flush load, and allocate load instructions had a separate opcode. By accessing r0 with a normal load instruction, an operation which would have been a NOP is now one of the cache control instructions. Little added circuitry is required and overhead of the system is, therefore, minimized. Additionally, because each of the cache control operations is a by-product of a normal load operation, implementing each as a load operation has distinct advantages. Most importantly, circuitry already required to execute a normal load operation may be used to execute each of the touch load, flush load, and allocate load instructions. Again, function of the device is increased while system overhead is minimized.

In addition to the BUS REQUEST, BURST MODE, READ/WRITE, MEMORY CYCLE, INVALIDATE, and SIZE signals previously discussed, data cache central control circuit 64 also drives the TRANSFER CODE signal to EXTERNAL DATA INFORMATION bus 19. The TRANSFER CODE signal is generated in response each of the SUPERVISOR, TOUCH, FLUSH, and ALLOCATE signals. Each of the signals discussed above is provided bus interface unit 22 during a bus cycle of data processor 20.

The TRANSFER CODE signal provides information about operation of data cache unit 24 to a user of data processor 20. In the embodiment of the invention described herein, the TRANSFER CODE signal provides "hints" as to the operation currently executed by data processor 20. Table 1 illustrates one embodiment of an encoding for the TRANSFER CODE signal.

TABLE 1

| TRANSFER CODE SIGNAL | OPERATION |
| --- | --- |
| 0000 | Reserved |
| 0001 | User Data Access |
| 0010 | User Touch, Flush, or Allocate Access |
| 0011 | Data MMU Table Search Operation |
| 0100 | Reserved |
| 0101 | Supervisor Data Access |
| 0110 | Supervisor Touch, Flush, or Allocate |
| 0111 | Snoop Copyback |
| 1000 | Reserved |
| 1001 | User Instruction Access |
| 1010 | Reserved |
| 1011 | Inst. MMU Table Search Operation |
| 1100 | Reserved |
| 1101 | Supervisor Instruction Access |
| 1110 | Reserved |
| 1111 | Reserved |

By encoding the TRANSFER CODE signal to represent each of the operations listed above in Table 1, a user is able to monitor the bus activity of INTERNAL INFORMATION bus 26. The user may use this information to gain insight into the operation of data cache unit 24. If the operation encoded by the TRANSFER CODE signal is "Reserved," no operation has yet been encoded. The reserved encodings are: 0000, 0100, 1000, 1010, 1100, 1110, and 1111.

When the TRANSFER CODE signal has a binary value of 0001, a user access of main memory 50 has been initiated. If the TRANSFER CODE signal has a binary value of 0010, a user has initiated either a touch load, flush load, or allocate load instruction. Data cache MMU 58 has initiated a hardware table search operation when the TRANSFER CODE signal has a binary value of 0011. During a table search operation, data MMU 58 searches for a physical address value. When the TRANSFER CODE signal has a binary value of 0101, a supervisor access of data in data cache unit 24 has been initiated. If the TRANSFER CODE signal has a binary value of 0110, either a touch load, flush load, or allocate load instruction has been initiated in a supervisor mode of operation. A snoop copyback operation is initiated when the TRANSFER CODE signal has a binary value of 0111. When the TRANSFER CODE signal has a binary value of 1001, the user is accessing main memory 50 for an instruction data value. A memory management unit (not shown) in instruction cache unit 26 has initiated a hardware table search operation when the TRANSFER CODE signal has a binary value of 1011. When the TRANSFER CODE signal has a binary value of 1101, instruction cache unit 26 is accessed in the supervisor mode of operation.

Although Table 1 illustrates many operations which may be encoded to provide external information to a user of data processor 20, information concerning operation of data cache 24 is of particular importance. When the TRANSFER CODE signal indicates that a touch load, flush load, or allocate load operation occurs, the user may use that information to implement an external smart memory controller (not shown) to provide control and data information for future cache transactions. The SIZE signal is used to differentiate between each of the touch load, flush load, or allocate load operations. As previously mentioned, the cache control operations were implemented using an existing load opcode which had r0 as a destination operand. A size of an access of the load operation was used to differentiate between each of the three operations. Therefore, when the TRANSFER CODE signal indicates that a cache control operation was executed. The SIZE signal may be used to determine whether it was a touch load, a flush load, or an allocate load operation.

In addition to the TRANSFER CODE and SIZE signals, bits zero through four of the physical address value are provided to an external memory or data processor (not shown) via INFORMATION bus 15. In addition to the TRANSFER CODE and SIZE signals, the physical address value may be encoded to provide information about future cache transactions. For example, in this embodiment of the invention, the lower four bits of the physical address value are not used for a specific purpose. Therefore, the lower four bits of the physical address may be encoded to provide more information to enable the smart memory controller to predict future operation of data cache 54 more reliably.

For example, if a touch load instruction is used to pre-fetch a line of data from main memory 50, the external smart memory controller might be able to automatically fetch a subsequent line of data from main memory 50. By fetching the subsequent line of data from main memory 50 before it is actually requested, an effective access time to main memory 50 is minimized. Although the short example described herein, implements a user mode cache control instruction, the TRANSFER CODE, SIZE, and physical address signals may also be easily used to enable the smart memory controller to anticipate any cache transaction.

As another example, assume that a page of memory is copied from hexadecimal address $0 to hexadecimal address $1000. During the copy transaction, memory stored at address $0 is read and then written to address $1000. This copy transaction continues in word size increments until the entire page of memory has been copied. Again, the TRANSFER CODE, SIZE, and physical address signals may be used to predict the repetitive nature of the copy transaction such that memory access time is minimized. In either case, the TRANSFER CODE signal allows a user to gain insight to the internal operation of data cache unit 24 and use that knowledge to predict future cache transactions.

In the implementations of the invention as described herein, control of a cache memory is provided to the user through both cache control operations and external information associated with operation of the cache memory. The cache control operations allow a user to configure the cache memory such that the execution of cache transactions is performed efficiently. Additionally, by providing external information associated with operation of the cache memory, the user may predict future cache transactions and provide necessary information in a minimal amount of time.

The implementation of the invention described herein is provided by way of example only. However, many other implementations may exist for executing the function described herein. For example, operations other than the touch load, flush load, and allocate load operations may be implemented. Each of these three operations is implemented as one embodiment of the invention. Additionally, the reserved encodings of the TRANSFER CODE, SIZE, and physical address signals may be used to provide more information concerning both operation of data processor 20.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processor having a cache memory, comprising:
an interface circuit for receiving a data processing instruction;
a decoder coupled to the interface circuit for receiving and decoding the data processing instruction, the decoder decoding a first portion of the data processing instruction to provide a first control signal, the decoder decoding a second portion of the data processing instruction to provide a second control signal, the decoder decoding a third portion of the data processing instruction to provide a register, the decoder decoding a fourth portion of the data processing instruction to provide an address value;
a cache memory access circuit coupled to the decoder for receiving the address value, the cache memory access circuit selectively accessing the cache memory in response to the address value, the cache memory access means providing a third control signal indicating when the address value corresponds to a memory location in the cache memory; and
cache control means for selectively performing a first cache memory access in response to the first control signal, the second control signal, the third control signal, and the address value when the register is one of a first plurality of registers and the cache control means performing a second cache memory access in response to the first control signal, the second control signal, the third control signal, and the address value when the register is one of a second plurality of registers.

2. The data processor having the cache memory of claim 1 wherein the second plurality of registers each store a constant value which may not be modified.

3. The data processor having the cache memory of claim 1 wherein the first cache memory access is a load operation which accesses a data value stored in a memory location in the cache memory.

4. The data processor having the cache memory of claim 1 wherein the second cache memory access operation is a cache touch load operation when the second control signal is a first value, a cache flush load operation when the second control signal is a second value, and a cache allocate load operation when the second control signal is a third value.

5. The data processor having the cache memory of claim 4 wherein a data value is stored in a cache memory location indicated by the address value provided by the fourth portion of the data processing instruction during execution of the cache touch load operation, the cache touch load operation being executed before a cache load operation accesses the cache memory location.

6. The data processor having the cache memory of claim 4 wherein a data value stored in a cache memory location indicated by the address value provided by the fourth portion of the data processing instruction is cleared in the cache memory and stored in an external memory during execution of the cache flush load operation.

7. The data processor having the cache memory of claim 4 wherein a cache memory location indicated by the address value provided by the fourth portion of the data processing instruction is allocated for a subsequent cache store operation during execution of the cache allocate operation.

8. The data processor having the cache memory of claim 1 wherein the second portion of the data processing instruction is an instruction suffix indicating a bit width of a data value.

9. The data processor having the cache memory of claim 8 wherein the second cache memory access operation is a cache touch load operation when the instruction suffix indicates the bit width is equal to a byte.

10. The data processor having the cache memory of claim 8 wherein the second cache memory access operation is a cache flush load operation when the instruction suffix indicates the bit width is equal to a word.

11. The data processor having the cache memory of claim 8 wherein the second cache memory access operation is a cache allocate load operation when the instruction suffix indicates the bit width is equal to a half-word.

12. The data processor having the cache memory of claim 1 wherein both the first cache memory access operation and the second cache memory access operation are executed in a user mode of operation.

13. The data processor having the cache memory of claim 1 wherein the first portion of the data processing instruction is an opcode which is identical for the first and second cache memory access operations.

14. The data processor having the cache memory of claim 1 wherein the cache control means provides a transfer code signal to an external user which indicates when the second cache access operation will be executed, the cache control means being coupled to the interface circuit for providing the transfer code signal.

15. A method for executing a cache memory access operation, comprising the steps of:
receiving a data processing instruction;
decoding a first portion of the data processing instruction to provide an opcode;
decoding a second portion of the data processing instruction to provide a first control signal;
decoding a third portion of the data processing instruction to provide a register;
decoding a fourth portion of the data processing instruction to provide an address value;
providing a second control signal to indicate when the address value corresponds to a memory location in a cache memory;
selectively accessing the memory location in the cache memory when the address value corresponds thereto;
performing a first cache memory access operation when the register is one of a first plurality of registers; and
performing a second cache memory access operation when the register is one of a second plurality of registers.

16. The method of claim 15 wherein the second cache memory access operation is a cache touch load operation when the first opcode is a load opcode and the first control signal indicates a byte size data access should be executed.

17. The method of claim 15 wherein the second cache memory access operation is a cache flush load operation when the first opcode is a load opcode and the first control signal indicates a word size data access should be executed.

18. The method of claim 15 wherein the second cache memory access operation is a cache allocate load operation when the first opcode is a load opcode and the first control signal indicates a half-word size data access should be executed.

19. The method of claim 15 wherein:
the first plurality of registers may be written and read; and
the second plurality of registers store a constant value which may be read only.

20. The method of claim 15 wherein the second data processing function further comprises the steps of:
storing a first data value in the memory location in the cache memory when the first control signal is a first value;
clearing a second data value in the memory location in the cache memory when the first control signal is a second value; and
allocating the memory location for a subsequent cache memory store operation when the first control signal is a third value.

21. The method of claim 20 wherein the first value indicates a bit width of a data access is a byte, the second value indicates the bit width of the data access is a word, and the third value indicates the bit width of the data access is a half-word.

* * * * *